Patented Dec. 8, 1953

2,662,097

UNITED STATES PATENT OFFICE 2,662,097

CONDENSATION PROCESS

Franklin H. Baldwin, Larchmont, N. Y., assignor to Ethyl Corporation, New York, N. Y., a corporation of Delaware No Drawing. Application October 30, 1951, Serial No. 253,987

2 Claims. (Cl. 260—573)

This invention relates to an improved process for the manufacture of ethanolamines.

The broad class of organic compounds falling within the definition of ethanolamines have utility in a variety of fields. For example, ethanolamines comprise important pharmaceuticals, chemical intermediates and antioxidant materials.

One important method of manufacturing such ethanolamines comprises the interreaction between alkene oxides, sometimes referred to as epoxides, and primary and secondary amines. The overall reaction involved can be described by the following typical equation wherein a primary amine is employed:

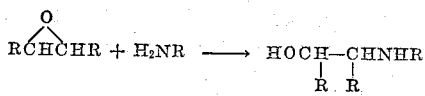

In this equation the R groups can be the same or different and include a variety of organic radicals such as aryl radicals, alkyl radicals, substituted aryl and alkyl radicals, and certain organic groups such as, for example, alkoxy- and aryloxy-methylene. Typical examples of the epoxides which can be employed in this process include styrene oxide, ethylene oxide, glycidyl methyl ether, glycidyl propyl ether, glycidyl phenyl ether, propylene oxide, 2,3-butylene oxide, 2,4-dichlorophenylethylene oxide, 1,2-epoxypentane, 1,2-butylene oxide, and the like. Typical examples of the amines which can be employed in this process include methyl amine, ethyl amine, methyl hexyl amine, aniline, p-phenylenediamine, p-aminophenol, o-aminoanethole, N-butyl-p-phenylenediamine, o-nitraniline, xylidine, ethanolamine, ethylenediamine, 3-ethylhexyl amine, 2-amino-5-hydroxytoluene, 2-pentadecyl-4-hydroxyaniline, 2,5-diaminotoluene, and the like.

Although this would appear to be a straightforward reaction, in practice it has been found to have certain serious disadvantages. One disadvantage which has been encountered and which has prevented its wide acceptance as a manufacturing process lies in the tendency of the epoxide compound to undergo side reaction in the process. Such side reactions are complicated and not clearly understood, but the overall effect is two-fold. In the first place the ultimate yield or efficiency obtainable in the process based upon the epoxide reactant is low. In the second place the recovery of the desired product is complicated by the presence of such products of the secondary reactions.

It is an object therefore of my invention to provide a method for conducting the interreaction between epoxides and amines so as to produce the resulting ethanolamines in improved yield. It is a further object of my invention to provide the above-mentioned process wherein the efficiency of utilization of the epoxide reactant is high. A still further object of my invention is to effect the interreaction between epoxide and amines so as to provide ethanolamines which can be readily separated in high purity and in good yield from the reaction mixture. Still further objects will be apparent from the further description of my invention hereinafter.

The above and other objects are accomplished by practicing my invention which comprises incorporating minor quantities of an aryl acetylene in a reaction mixture comprising an epoxide and an amine. The effectiveness of aryl acetylenes in improving the yield and increasing the ease of recovery of the desired ethanolamine reaction product is not understood. However, I have found that the aryl acetylenes can be employed in minor proportions with respect to other reactant and in this sense the aryl acetylene can be considered as being a catalyst for the reaction. An alternative way of considering the action of such aryl acetylene reaction improvers can be as inhibitors for undesirable side reactions.

Among the aryl acetylenes which can be employed in the process of my invention, I prefer to employ phenyl acetylene, primarily because of its availability, economy and ease of manufacture. However, other aryl acetylenes can be employed, typical examples of which include diphenyl acetylene, o-tolyl acetylene, xylyl acetylene, α-naphthyl acetylene, terphenyl acetylene, methyl phenyl acetylene, phenyl α-naphthyl acetylene, iso-butyl phenyl acetylene, p-chlorophenyl acetylene, 4-acetylenodiphenyl, p-methoxyphenyl acetylene and the like.

In order to further illustrate the operation of the process of my invention and to point out the improvements obtained thereby, the following working examples wherein all parts and percentages are by weight provide specific examples of methods of conducting my invention.

EXAMPLE I

In a reaction vessel provided with an agitator, means for returning reflux to the reaction vessel and means for introducing liquid reactants was placed 25 parts of p-aminophenol and 40 parts of anhydrous methyl alcohol. The resulting solution was agitated and 27 parts of phenylethylene oxide dissolved in 40 parts of anhydrous methyl alcohol was added over a period of one-half hour while maintaining the temperature at about 25° C. At the end of this period the mixture was heated to the reflux temperature at atmospheric pressure for a period of six hours. The reaction mixture was then allowed to stand at a temperature of 25° C. for 12 hours. At the end of this period the methanol was removed by distillation at atmospheric pressure and the result-

TABLE

| Epoxide Reactant | Amino Reactant | Reaction Product |
| --- | --- | --- |
| Phenylethylene oxide | Dimethylamine | N-(β-hydroxyphenylethyl)-dimethylamine. |
| Do | Ethylenediamine | N-(β-hydroxyphenylethyl)-ethylenediamine. |
| Do | Aniline | N-(β-hydroxyphenylethyl)-aniline. |
| Do | p-Anisidine | N-(β-hydroxyphenylethyl)-p-anisidine. |
| Do | p-Aminophenol | N-(β-hydroxyphenylethyl)-p-hydroxyaniline. |
| Do | p-Phenylenediamine | N-(β-hydroxyphenylethyl)-p-phenylenediamine. |
| Do | 2-Amino-5-hydroxytoluene | N-(β-hydroxyphenylethyl)-2-methyl-4-hydroxy benzene. |
| Do | 4-Aminodiphenylamine | N-(β-hydroxyphenylethyl)-aminodiphenylamine. |
| Glycidyl methyl ether | p-Aminophenol | N-(β-hydroxy-β-methoxymethyleneethyl)-p-hydroxyaniline. |
| Glycidyl phenyl ether | do | N-(β-hydroxy-β-phenoxymethyleneethyl)-p-hydroxyaniline. |
| Glycidyl propyl ether | do | N-(β-hydroxy-β-propoxymethyleneethyl)-p-hydroxyaniline. |
| Ethylene oxide | 4-hydroxy-6-pentadecylaniline | N-(4-hydroxy-6-pentadecylphenyl)-ethanolamine. | ing residue was distilled at a pressure of 1 mm. of mercury absolute. A total of 13 parts of material was removed from the reaction vessel during this vacuum distillation at a temperature of 178 to 182° C., the major portion of which polymerized and condensed on the walls of the vessel where decomposition occurred.

EXAMPLE II

Following the procedure of Example I with the exception that the operation was conducted in the presence of 0.2 parts of phenyl acetylene, a product was recovered during the vacuum distillation which boiled at 230 to 240° C. at a pressure of 2 mm. of mercury. The yield of this product was 19.5 parts. This material solidified to provide a solid melting at 76 to 78° C. By analysis it was determined that this product contained 6.2 weight per cent nitrogen identifying it, therefore, as N-(β-hydroxyphenylethyl)-aminophenol, the theoretical nitrogen content being 6.1 weight per cent.

EXAMPLE III

Following the procedure of Example II, 10.8 parts of p-phenylenediamine and 40 parts of absolute alcohol was interreacted with 24 parts of phenylethylene oxide in the presence of 0.2 parts of phenyl acetylene. The product N-(β-hydroxyphenylethyl)-p-phenylenediamine was 20 parts and contained 11.7 per cent nitrogen.

EXAMPLE IV

The procedure of Example III was duplicated with the exception that the phenylacetylene was not added until after the reaction was complete. Under these conditions the product was only 18 parts and did not possess the purity of the product of Example IV.

EXAMPLE V

Following the procedure of Example II, 3.5 parts of 4-aminodiphenylamine was interreacted with 2.5 parts of phenylethylene oxide in the presence of 0.05 parts of phenyl acetylene. After distillation at 125–130° C. at a pressure of 2 mm. of mercury 14 parts of N-(β-hydroxyphenylethyl) aminodiphenylamine was recovered.

In the following table are listed a number of illustrative combinations which I have employed in my process along with aryl acetylenes to provide the reaction product identified in the last column of the table.

The temperature employed in conducting my process is not critical. However, I have found that elevated temperatures are not essential. Thus I can effect the condensation between the alkene oxide and the amine at temperatures as low as about 10° C. or at the reflux temperature of the solvent. In a preferred embodiment of my process I employ temperatures in the range of about 20° C. to about 50° C.

The condensation in the presence of the aryl acetylene does not require a pressure operation although such can be employed particularly when one of the reactants is highly volatile or is a gas at the temperature of operation.

I prefer to employ a liquid reaction medium in my process and for this purpose I can employ a solvent. Typical solvents which can be employed include aromatic and aliphatic hydrocarbons, chlorinated hydrocarbons, alcohols, esters, ketones and the like. However, in order to provide a liquid reaction medium in the place of such solvents as typified above, I can employ an excess of one or more of the reactants when such are liquid at the reaction temperature.

Having thus described a number of methods of conducting the improved process of my invention, I do not intend that my invention be limited except as in the appended claims.

I claim:

1. The improvement in the process of interreacting a 1,2-epoxide with a material selected from the group consisting of primary and secondary amines to produce an ethanolamine which comprises conducting the reaction in a lower aliphatic alcohol solvent at a temperature between about 20 to 50° C. and in the presence of a catalytic quantity of a carbocyclic aryl acetylene.

2. The process of claim 1 wherein the aryl acetylene is phenyl acetylene.

FRANKLIN H. BALDWIN.

References Cited in the file of this patent

UNITED STATES PATENTS

| Number | Name | Date |
| --- | --- | --- |
| 2,003,386 | Olpin et al. | June 4, 1935 |

FOREIGN PATENTS

| Number | Country | Date |
| --- | --- | --- |
| 702,553 | France | Apr. 11, 1931 |